Figure 1:
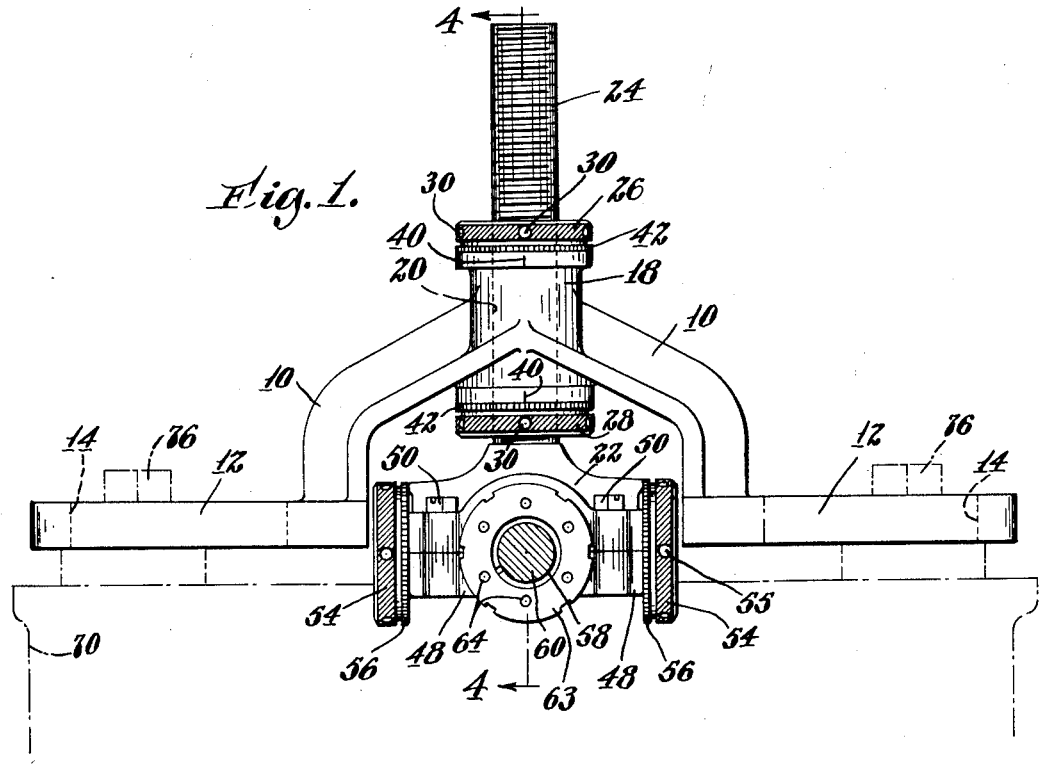

Dec. 19, 1933.  E. P. MOOERS  1,939,786

BORING TOOL FIXTURE

Original Filed May 21, 1928   3 Sheets-Sheet 1

Inventor
Edward P. Mooers
by Francis W. Dakin
Attorney

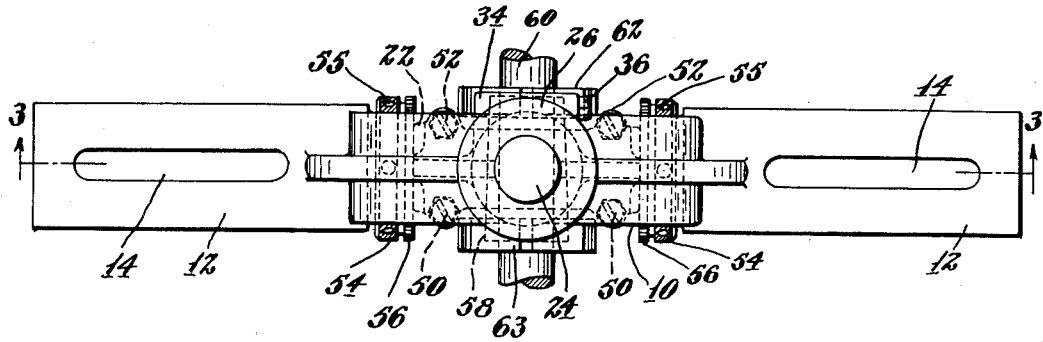
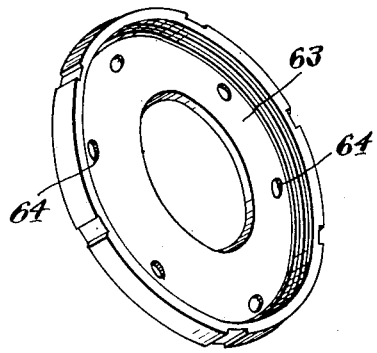
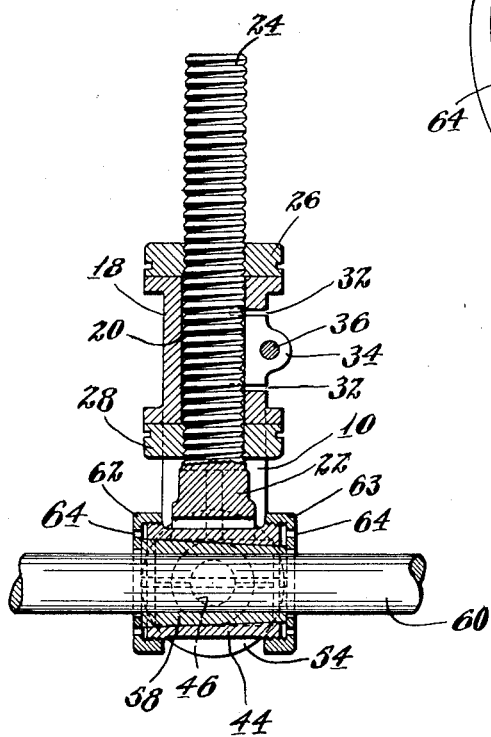
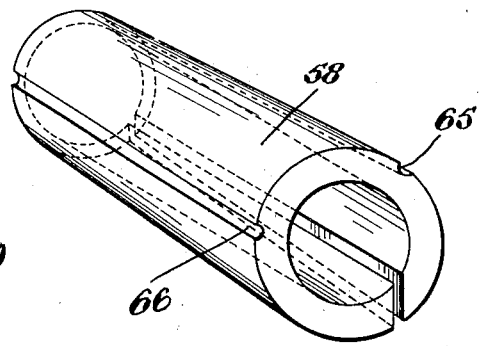

Patented Dec. 19, 1933

1,939,786

UNITED STATES PATENT OFFICE 1,939,786

BORING TOOL FIXTURE

Edward P. Mooers, Watertown, Mass.

Application May 21, 1928, Serial No. 279,290
Renewed April 27, 1933

8 Claims. (Cl. 77—2)

This invention relates to a boring tool fixture for boring bearings and while designed with particular reference to boring bearings for crank shafts of internal combustion engines and particularly those used in automobiles, it is susceptible of use for other purposes where a plurality of bearings in exact and accurate alignment is required.

The most prolific source of imperfect operation in internal combustion engines used in trucks and automobiles arises from the lack of alignment in the bearings of the crank-shaft due to long wear or other causes. Owing to the high speed of operation of such engines or motors a lack of alignment in the bearings of a few thousandths of an inch is productive of innumerable troubles generally ascribed to other causes and frequently resulting in the motor being thrown upon the junk heap as worn out. As a matter of fact, however, in many cases, the life of the motor may be indefinitely extended by trueing up the crank-shaft if it has become bent, and by providing new bearings in perfect alignment. It has been found in practice that re-alignment of the bearings will eliminate many difficulties which heretofore appeared incurable and caused the junking of the motor and will extend the life of the motor at a cost far below the cost of a new motor and the advantages of such repairs have been especially noticeable in the case of motors used on trucks.

In boring a set of new bearings for a crank-shaft, it is customary to use a boring bar in which are set at the proper intervals cutters for boring all the new bearings simultaneously. The boring bar is carried by a plurality of fixtures temporarily fastened to the crank-case for centering it accurately and exactly in the crank-case in the position to be occupied by the crank-shaft. If the boring bar is not accurately positioned to thousandths of an inch, the bearings will be bored off center with the center axis of the crank-shaft and trouble will develop in the motor. Furthermore, the boring bar must be so tightly supported during the boring process that all movement of the bar off center or possibility of its bending is obviated.

The main object of the invention is the provision of a fixture in which the boring bar holding member is micrometrically adjustable in all directions thereby permitting the boring bar to be centered exactly.

Another object is the provision of a fixture which will at all times during the boring operation hold the boring bar in its true centered position to insure bearings in absolute alignment.

A further object of the invention is the provision in a fixture of the character described of a boring bar holding member which is adjustable to regulate its grip upon the bar.

Other objects of the invention will be more specifically set forth and described hereinafter.

My invention contemplates a fixture comprising a bracket adapted to be fastened cross-wise to the crank-case in which the bearings are to be bored, a hanger vertically adjustable in said bracket and a housing carried by and transversely adjustable in said hanger for supporting and centering the boring bar. By adjusting the hanger and housing the boring bar may be centered in any desired location.

One of the features of my invention resides in providing means for adjusting the hanger and housing micrometrically and for locking them in such adjusted position. This makes it possible to secure the most exact and accurate centering of the boring bar and to attain this adjustment with the least expenditure of time and effort.

Another feature of the invention consists in providing means to be carried by the housing for holding the boring bar against lateral movement during the boring process so that the cutters will bore the bearings on a true circle. If the bar is not held tightly, the bearing will be cut off a true circle which may affect the operation of the motor when the crank-shaft is installed.

Figure 3:
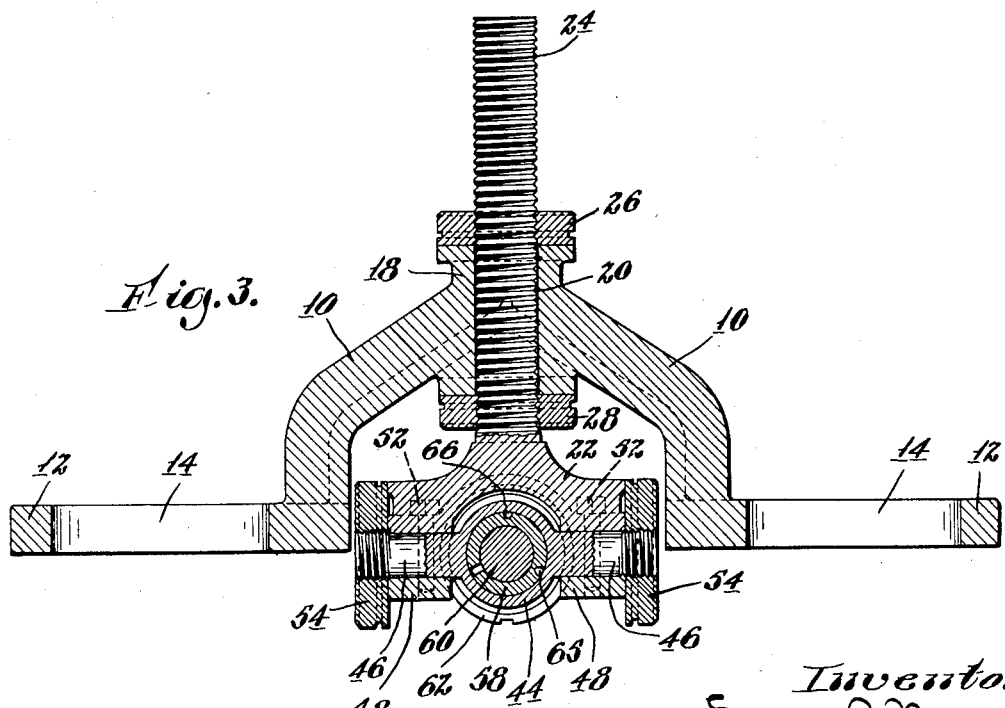
Figure 1:
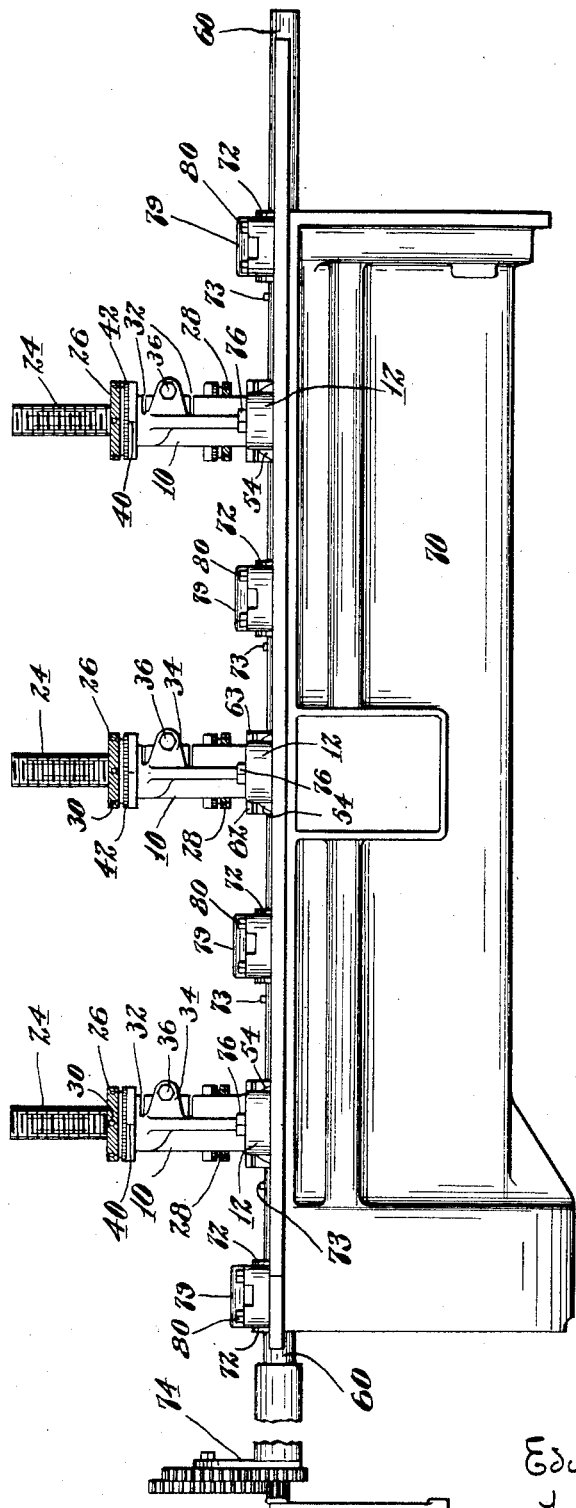

In the drawings illustrating the preferred form of my invention, Figure 1 is a side elevation of a boring bar fixture constructed in accordance with my invention and mounted cross-wise on a crank casing shown in broken lines; Fig. 2 is a plan view of the same looking downwardly in Fig. 1; Fig. 3 is a vertical central sectional view on line 3—3 in Fig. 2; Fig. 4 is a vertical central sectional view on line 4—4 in Fig. 4 looking from right to left with the boring bar in elevation; Fig. 5 is a view in perspective of an adjustable split cone bushing for gripping the boring bar; Fig. 6 is a view in perspective of a bushing end thrust collar for setting up the cone bushing to grip the boring bar and Fig. 7 is a side elevation of a crank-case having three fixtures of my construction fastened thereto with the boring bar supported in operative position therein to illustrate the use of my invention.

Referring to the drawings illustrating one form of the invention, there is shown a bracket comprising an arched center portion 10 having side extensions 12, each of which has an elongated longitudinal slot 14 for receiving bolts 16 for fastening the bracket in an upright position cross-wise a crank-case. In its center the arched portion 10 is enlarged to form a hub 18 which is pierced longitudinally by a vertical smooth bore 20. The bracket may be made, however, in any suitable manner.

A T-shaped hanger is mounted in the bracket with its head portion 22 depending and its shank 24 fitting in the smooth bore 20. The shank is provided with a flat thread and two adjusting units 26 and 28 are threaded on the shank, one at each end of the hub 18 of the bracket, for adjusting it vertically in the hub of the bracket and locking it in adjusted position. Both nuts have radial holes 30 in their peripheries for receiving a tool to turn them when necessary.

The thread on the shank of the hanger is preferably a flat thread so that the shank makes a close fit with the smooth bore of the hub 18 to prevent any oscillation of the hanger when carrying the boring bar. As a further precaution against oscillation, the hub 18 is (Fig. 4) provided on one side with two parallel transverse circumferential cuts 32 and the portion of the hub between the cuts is cut out vertically to form two clamping ears 34 spaced apart slightly and bored to receive a screw bolt 36 for drawing the two ears together to bind the shank of the hanger tightly within the hub after the hanger has been adjusted vertically. The cuts 32 are sufficiently far apart to insure a clamping surface long enough to prevent the slightest degree of oscillation so that the hanger when adjusted is in fixed position.

In adjusting the hanger vertically, the bolt 36 is loosened to release the clamping action of the ears 34 and then the hanger may be dropped vertically in the bracket by turning the nut 26 in the proper direction. If the hanger is to be raised, the lower nut 28 should be released and the hanger may then be elevated by operation of the upper nut 26 which really supports and carries the hanger in the bracket. After the proper vertical adjustment has been made, then the lower nut may be set up tightly against the hub and serves to lock the shank of the hanger against displacement in a vertical direction and the clamping bolt 36 may be tightened to bind the said shank against oscillation. To secure a micrometer adjustment, the hub 18 may be provided with center marks 40 (Fig. 1) on one side and each nut may be provided with numbered graduations 42 on that edge engaging the hub.

The depending head 22 of the hanger carries a bushing housing in the form of a collar 44 having two arms 46 laterally extending therefrom in opposite directions, which housing is held in the head of the hanger by two clamps 48, one on each side of the collar 44, and each held in place by two screw bolts 50 and 52 (Figs. 1 and 2). The head 22 is provided with a central semi-circular recess larger than the outside diameter of the collar 44 which permits the housing to be adjusted longitudinally the head and the arms 46 are circular in cross-section fitting in grooves in the head and clamps, and have threaded ends projecting beyond the ends of the head for receiving adjusting nuts 54 which may be similar in construction to the nuts 26 and 28 with radial tool receiving holes 55 and marginal numbered graduations 56 for micrometer adjustment.

The bore of the bushing housing 44 is preferably cone-shaped for holding a split cone-shaped bushing 58 having a straight bore for supporting a boring bar 60. For setting up the bushing to grip the boring bar the two ends of the housing collar 44 are provided with external threads to receive two collars 62 and 63 having internally threaded flanges and spanner holes 64 and to insure uniform contraction of the bushing it may be provided with one or more external longitudinal grooves 65.

To illustrate the use of a fixture constructed in accordance with my invention, there is shown in Figure 1 a portion of a crank-case 70 with a boring mechanism set up and supported by three fixtures of the form hereinbefore described. The crank-case is shown with four bearings 72 and the three fixtures are arranged between bearings. The number of fixtures used will depend upon the number of bearings to be bored. The boring bar 60 is provided with a plurality of cutters 73 and at one end with a feeding mechanism 74 of well-known construction operated by a hand crank 75.

In setting up the fixtures, they are first bolted to the crank-case by bolts 76 through the recesses 14 in the side extensions 12 centering the hangers as near as possible to the center axes of the bearings to be bored. The boring bar is then mounted in the fixtures and adjusted in exact position at the two ends of the crank case first and then intermediate the two ends and the cone bushings are set up and locked between the two end thrust collars 54. In centering the boring bar, the hanger is adjusted vertically and the housing horizontally and these adjustments are made by turning the nut 26 for the hanger and one of the nuts 54 for the housing which insures an absolute micrometric adjustment of the boring bar. Upon the completion of the adjustments, the hanger and housing are locked in position by manipulation of the nut 28 and the other nut 54 and the cone bushing is set up by operating the collars 62 and 63 to grip the boring rod tightly and is locked in position between the collars.

One of the outstanding advantages of fixtures constructed in accordance with my invention is that after the boring bar has been centered and locked in a plurality of the fixtures, it may then be adjusted in a vertical or a lateral direction in order to compensate for the wear on the gears for operating the cam shaft from the crank shaft. It frequently happens that there is a play between these gears and when the bearings are being rebored, it is important that such play should be taken up and that the gears should mesh properly. My fixture enables this to be done accurately and the bar to be adjusted as a unit either vertically or horizontally. Preferably this result is accomplished by establishing a fixed relation between the threads and the graduations on the nuts mounted on those threads. For instance, the shank 24 is provided with ten threads to the inch and the nuts 26 and 28 are provided with fifty graduations each on its perimeter so that the turning of the nut 26 either raises or lowers the hanger two-thousandths of an inch for each graduation of turning. In the lateral adjustment, the threads on the two arms 46 of the bushing housing are twenty to the inch and each nut 54 has twenty-five divisions on its perimeter so that the bushing housing is moved laterally two-thousandths of an inch for each graduation that the nuts 54 are turned. If it becomes necessary to lower the boring bar throughout its entire length ten-thousandths of an inch and to move it laterally four-thousandths of an inch, it is easily accomplished by turning all of the nuts 26 five graduations and by turning the nut 54 two graduations. The number of threads to the inch on the shank 24 and on the arms 46 and the number of graduations on the nuts may, of course, be varied but there should be a fixed relation between the thread and the graduations of the nuts in each case so that each graduation will represent one or more thousandths of an inch. This micrometer adjustment also permits the boring bar to be raised at one end a specified number of thousandths of an inch in order to bring it to an absolute perpendicular relation with the axes of the cylinders. If, for any reason, it appears that the centering of the boring bar when measured from the top of the crank case casing should turn out to be inaccurate.

It will be observed that the use of cone bushings in the bushing housing facilitates holding the boring bar during the boring operation in perfect alignment and prevents any possibility of lateral movement thereof with the result that the bearings are at the conclusion of the boring operation in absolute and exact alignment.

It is further to be observed that the fixture may be adjusted with a minimum expenditure of time and effort which conduces to economy in operations.

It is to be understood that my invention is not to be limited to the form herein shown and described which is merely one exemplification of the invention since it may be embodied in various other forms of construction all within the purview of the following claims.

What I claim is:

1. A boring tool fixture having, in combination, an arched bracket having slotted side extensions for adjustably fastening said bracket cross-wise a crank-case, a T-shaped hanger vertically suspended in reversed position in the arch of said bracket and having a threaded shank, a pair of adjusting nuts for adjusting said hanger vertically and for locking it in adjusted position in said arched bracket, a bushing housing carried in the head of said hanger and adjustable therein transversely said shank portion thereof and in a direction parallel with the longitudinal axis of said bracket, said housing being provided with a through-and-through opening for receiving a cone bushing and means for locking said housing in adjusted position in said hanger.

2. A boring tool fixture having, in combination, an arched bracket having side extensions for fastening said bracket cross-wise a crank-case, a T-shaped hanger vertically suspended in reversed position in the arch of said bracket and having a threaded shank, a pair of adjusting nuts for adjusting said hanger vertically and for locking it in adjusted position in said arched bracket, a bushing housing carried in the head of said hanger and adjustable therein transversely said shank portion thereof and in a direction parallel with the longitudinal axis of said bracket, said housing being provided with a through-and-through opening for receiving a cone bushing, means for locking said housing in adjusted position in said hanger and a split cone bushing mounted in said housing and a collar mounted on said housing and engaging the large end of said cone bushing for setting up the same to grip tightly a boring bar mounted in said housing.

3. A boring tool fixture having, in combination, an arched bracket having side extensions for fastening said bracket cross-wise a crank case, a hanger vertically suspended in the arch of said bracket and having a threaded shank, a pair of adjusting nuts for adjusting said hanger vertically and for locking it in adjusted position in said arched bracket, a bushing housing carried by said hanger and adjustable therein transversely said shank portion thereof and in a direction parallel with the longitudinal axis of said bracket, said housing being provided with a through-and-through opening for receiving a cone bushing, means for locking said housing in adjusted position in said hanger and a split cone bushing provided with a plurality of longitudinal grooves on its outer surface to facilitate the setting up of said bushing mounted in said housing and a collar mounted on said housing and engaging one end of said cone bushing for setting up the same to grip tightly a boring bar mounted therein.

4. A boring tool fixture having, in combination, a bracket adapted for adjustable mounting crosswise a crank-case, a T-shaped hanger reversely and adjustably mounted in said bracket, the head of said hanger having a central recess and a bushing housing mounted in said recess and provided with oppositely disposed arms fitting longitudinal bores in said head, each of said arms having its outer end threaded and provided with an adjusting nut for micrometrically adjusting said bearing in a longitudinal direction in said head and for locking it in adjusted position.

5. A boring tool fixture having, in combination, a bracket adapted for adjustable mounting crosswise a crank-case, and provided with a central vertical smooth bore, a T-shaped hanger having a recessed head and a threaded shank and reversely mounted in said bracket with its shank in the vertical bore thereof, a pair of adjusting nuts threaded on said shank, one at each end of said bore for adjusting micrometrically said hanger vertically in said bracket and for locking it in adjusted position and a bushing housing mounted in said recess and provided with oppositely disposed arms fitting longitudinal bores in said head, each of said arms having its outer end threaded and provided with an adjusting nut for micrometrically adjusting said bearing in a longitudinal direction in said head and for locking it in adjusted position.

6. A boring tool fixture having, in combination, an arched bracket adapted for adjustable mounting crosswise of a crank-case, a T-shaped hanger reversely mounted in the arched portion of said bracket and vertically adjustable therein, the head of said hanger being cut out to form a central open recess and the two ends of said head having longitudinal bores opening into said recess, a bushing housing loosely mounted in said recess and provided with oppositely disposed arms fitting the longitudinal bores in said head and having their ends projecting therefrom and a nut threaded on the end of each arm for adjusting said housing lonitudinally of said head and crosswise of the crank-case.

7. A boring tool fixture having, in combination, an arched bracket adapted for adjustable mounting crosswise of a crank-case, a hanger approximately T-shaped reversely mounted in the arched portion of said bracket and vertically adjustable therein, the head of said hanger having a central arched recess opening downwardly and the two ends of said head having longitudinal bores opening into said recess and in alignment each with the other, a housing adapted for carrying a cone-shaped bushing, said housing being loosely mounted in said recess and provided with oppositely disposed arms fitting said longitudinal bores and having their ends projecting therefrom and a nut threaded on the end of each arm for adjusting said housing in a direction crosswise of the crank-case.

8. A boring tool fixture having, in combination, an arched bracket adapted for adjustable mounting crosswise of a crank-case, a T-shaped hanger reversely mounted in the arched portion of said bracket and vertically adjustable therein, the head of said hanger being cut out to form a central open recess and the two ends of said head having longitudinal bores opening into said recess, a housing adapted for carrying a cone-shaped bushing, said housing being loosely mounted in said recess and provided with oppositely disposed arms fitting said longitudinal bores and having their end projecting therefrom, a nut threaded on the end of each arm for adjusting said housing in a direction crosswise of the crank-case, a split cone-shaped bushing mounted in said housing and a flanged collar threaded on one end of said housing for adjusting said bushing therein to grip a boring bar.

EDWARD P. MOOERS.